(12) United States Patent
Yuzawa et al.

(10) Patent No.: US 12,548,661 B2
(45) Date of Patent: Feb. 10, 2026

(54) DOCUMENT CREATION SUPPORT APPARATUS, DOCUMENT CREATION SUPPORT METHOD, AND DOCUMENT CREATION SUPPORT PROGRAM

(71) Applicant: FUJIFILM Corporation, Tokyo (JP)

(72) Inventors: Takuya Yuzawa, Tokyo (JP); Keigo Nakamura, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 288 days.

(21) Appl. No.: 18/498,079

(22) Filed: Oct. 31, 2023

(65) Prior Publication Data

US 2024/0062883 A1 Feb. 22, 2024

Related U.S. Application Data

(63) Continuation of application No. PCT/JP2022/017624, filed on Apr. 12, 2022.

(30) Foreign Application Priority Data

May 13, 2021 (JP) ................................. 2021-081876
Jan. 24, 2022 (JP) ................................. 2022-008875

(51) Int. Cl.
*G16H 30/40* (2018.01)
*G06T 7/00* (2017.01)
*G06V 10/25* (2022.01)
*G16H 15/00* (2018.01)

(52) U.S. Cl.
CPC ........... *G16H 30/40* (2018.01); *G06T 7/0016* (2013.01); *G06V 10/25* (2022.01); *G16H 15/00* (2018.01)

(58) Field of Classification Search
None
See application file for complete search history.

(56) References Cited

U.S. PATENT DOCUMENTS

| 2011/0144482 | A1 | 6/2011 | Sendai et al. |
| 2017/0091949 | A1 | 3/2017 | Akasaka et al. |
| 2017/0300664 | A1 | 10/2017 | Matsuki |
| 2019/0139218 | A1* | 5/2019 | Song .................... G06F 40/174 |

FOREIGN PATENT DOCUMENTS

| JP | H07323024 | 12/1995 |
| JP | 2011120747 | 6/2011 |
| JP | 2015146864 | 8/2015 |
| JP | 2017068380 | 4/2017 |
| JP | 2017191461 | 10/2017 |

OTHER PUBLICATIONS

"International Search Report (Form PCT/ISA/210) of PCT/JP2022/017624", mailed on Jul. 5, 2022, with English translation thereof, pp. 1-5.
"Written Opinion of the International Searching Authority (Form PCT/ISA/237) of PCT/JP2022/017624", mailed on Jul. 5, 2022, with English translation thereof, pp. 1-6.

* cited by examiner

*Primary Examiner* — Lennin R Rodriguezgonzalez
(74) *Attorney, Agent, or Firm* — JCIPRNET (57) ABSTRACT

A document creation support apparatus acquires information representing a plurality of regions of interest included in a medical image, acquires position information representing a position designated by a user in the medical image displayed on a display device, selects, based on the position information, two or more regions of interest from among the plurality of regions of interest, and derives an evaluation index for each of the two or more selected regions of interest as a target to be in a medical document.

18 Claims, 8 Drawing Sheets

| TYPE | EVALUATION VALUE |
|---|---|
| LIVER CYST | Low |
| HEPATOCELLULAR CARCINOMA | High |
| ... | ... |

A MASS LESION MEASURING 18 mm IN LENGTH IS VISIBLE IN S5 OF THE LIVER. THE LESION IS DEEPLY STAINED IN THE ARTERIAL PHASE AND HAS REDUCED ABSORPTION IN THE EQUILIBRIUM PHASE, AND THUS HEPATOCELLULAR CARCINOMA IS SUSPECTED.
TWO CYSTS ARE VISIBLE IN S5 OF THE LIVER.

FIG. 7

· A MASS LESION MEASURING 18 mm IN LENGTH IS IN S5 OF THE LIVER. DEEPLY STAINED IN THE ARTERIAL PHASE AND HAVING REDUCED ABSORPTION IN THE EQUILIBRIUM PHASE. HEPATOCELLULAR CARCINOMA IS SUSPECTED.
· TWO CYSTS ARE IN S5 OF THE LIVER.

FIG. 8

| PART | TYPE | FINDINGS |
|---|---|---|
| S5 OF LIVER | HEPATOCELLULAR CARCINOMA | MEASURING 18 mm IN LENGTH, DEEPLY STAINED IN ARTERIAL PHASE, HAVING REDUCED ABSORPTION IN EQUILIBRIUM PHASE |
| S5 OF LIVER | LIVER CYST | MEASURING 15 mm IN LENGTH, NO EFFECT OF CONTRAST IMAGING |
| S5 OF LIVER | LIVER CYST | MEASURING 10 mm IN LENGTH, NO EFFECT OF CONTRAST IMAGING |

A MASS LESION MEASURING 18 mm IN LENGTH IS VISIBLE IN S5 OF THE LIVER. THE LESION IS DEEPLY STAINED IN THE ARTERIAL PHASE AND HAS REDUCED ABSORPTION IN THE EQUILIBRIUM PHASE, AND THUS HEPATOCELLULAR CARCINOMA IS SUSPECTED.

FIG. 11

| High | Low | |
|---|---|---|
| PART | TYPE | FINDINGS |
| S5 OF LIVER | HEPATOCELLULAR CARCINOMA | MEASURING 18 mm IN LENGTH, DEEPLY STAINED IN ARTERIAL PHASE, HAVING REDUCED ABSORPTION IN EQUILIBRIUM PHASE |

| High | Low | |
|---|---|---|
| PART | TYPE | FINDINGS |
| S5 OF LIVER | LIVER CYST | MEASURING 15 mm IN LENGTH, NO EFFECT OF CONTRAST IMAGING |
| S5 OF LIVER | LIVER CYST | MEASURING 10 mm IN LENGTH, NO EFFECT OF CONTRAST IMAGING |

FIG. 12

A MASS LESION MEASURING 18 mm IN LENGTH IS VISIBLE IN S5 OF THE LIVER. THE LESION IS DEEPLY STAINED IN THE ARTERIAL PHASE AND HAS REDUCED ABSORPTION IN THE EQUILIBRIUM PHASE, AND THUS HEPATOCELLULAR CARCINOMA IS SUSPECTED. TWO CYSTS ARE VISIBLE IN S5 OF THE LIVER.

| TYPE | EVALUATION VALUE |
|---|---|
| LIVER CYST | Low |
| HEPATOCELLULAR CARCINOMA | High |

CONFIRM
CORRECT

A MASS LESION MEASURING 18 mm IN LENGTH IS VISIBLE IN S5 OF THE LIVER. THE LESION IS DEEPLY STAINED IN THE ARTERIAL PHASE AND HAS REDUCED ABSORPTION IN THE EQUILIBRIUM PHASE, AND THUS HEPATOCELLULAR CARCINOMA IS SUSPECTED.
TWO CYSTS ARE VISIBLE IN S5 OF THE LIVER.

FIG. 15

DOCUMENT CREATION SUPPORT APPARATUS, DOCUMENT CREATION SUPPORT METHOD, AND DOCUMENT CREATION SUPPORT PROGRAM

CROSS-REFERENCE TO RELATED APPLICATIONS

This application is a continuation of International Application No. PCT/JP2022/017624, filed on Apr. 12, 2022, which claims priority from Japanese Patent Application No. 2021-081876, filed on May 13, 2021 and Japanese Patent Application No. 2022-008875, filed on Jan. 24, 2022. The entire disclosure of each of the above applications is incorporated herein by reference.

BACKGROUND

1. Technical Field

The present disclosure relates to a document creation support apparatus, a document creation support method, and a document creation support program.

2. Description of the Related Art

In the related art, techniques for increasing the efficiency of creating a medical document such as an interpretation report by doctors have been proposed. For example, JP1995-323024A (JP-H07-323024A) discloses a technique of determining, based on coordinates designated by a doctor in a medical image and data obtained by dividing the medical image into regions of respective parts, a part indicated by the designated coordinates and outputting an abnormality-present part and a name of a disease.

In addition, JP2015-146864A discloses a technique of accepting selection of a partial region of a medical image and outputting diagnosis information and a name of a region of interest including the selected region.

SUMMARY

However, when a user such as a doctor designates a plurality of regions of interest, the techniques described in JP1995-323024A (JP-H07-323024A) and JP2015-146864A may fail to determine for which region of interest among the plurality of region of interest the user desires to create a medical document. Thus, the techniques described in JP1995-323024A (JP-H07-323024A) and JP2015-146864A may fail to appropriately support creation of a medical document.

The present disclosure has been made in view of the circumstance described above, and an object of the present disclosure is to provide a document creation support apparatus, a document creation support method, and a document creation support program that can appropriately support creation of a medical document also when a user designates a plurality of regions of interest.

A document creation support apparatus according to the present disclosure is a document creation support apparatus including at least one processor. The at least one processor acquires information representing a plurality of regions of interest included in a medical image, acquires position information representing a position designated by a user in the medical image displayed on a display device, selects, based on the position information, two or more regions of interest from among the plurality of regions of interest, and derives an evaluation index for each of the two or more selected regions of interest as a target to be in a medical document.

In the document creation support apparatus according to the present disclosure, the at least one processor may be configured to derive the evaluation index in accordance with a type of each of the two or more selected regions of interest.

In the document creation support apparatus according to the present disclosure, the at least one processor may be configured to derive the evaluation index for each of the two or more selected regions of interest in accordance with presence or absence of a change from an identical region of interest detected in a past examination.

In the document creation support apparatus according to the present disclosure, the at least one processor may be configured to derive the evaluation index for each of the two or more selected regions of interest in accordance with whether an identical region of interest has been detected in a past examination.

In the document creation support apparatus according to the present disclosure, the at least one processor may be configured to derive the evaluation index in accordance with whether a region of interest of a type identical to a type of each of the two or more selected regions of interest has been written in the medical document.

In the document creation support apparatus according to the present disclosure, the at least one processor may be configured to derive the evaluation index in accordance with a distance between each of the two or more selected regions of interest and the position designated by the user and represented by the position information.

In the document creation support apparatus according to the present disclosure, each of the plurality of regions of interest may be a region including an abnormal shadow.

In the document creation support apparatus according to the present disclosure, the at least one processor may be configured to generate, based on the evaluation index, text including descriptions about the two or more selected regions of interest.

In the document creation support apparatus according to the present disclosure, the at least one processor may be configured to determine, in accordance with the evaluation index, a region of interest to be included in the text from among the two or more selected regions of interest.

In the document creation support apparatus according to the present disclosure, the at least one processor may be configured to determine, in accordance with the evaluation index, whether to include a feature of a corresponding one of the two or more selected regions of interest in the text.

In the document creation support apparatus according to the present disclosure, the at least one processor may be configured to determine, in accordance with the evaluation index, a description order of the two or more selected regions of interest.

In the document creation support apparatus according to the present disclosure, the at least one processor may be configured to determine, in accordance with the evaluation index, a description amount of the text for the two or more selected regions of interest.

In the document creation support apparatus according to the present disclosure, the evaluation index is an evaluation value, and the at least one processor may be configured to generate, for the two or more selected regions of interest, text which includes descriptions about the two or more selected regions of interest sequentially from a region of interest with the highest evaluation value and of which an upper-limit value is a predetermined number of characters.

In the document creation support apparatus according to the present disclosure, the at least one processor may be configured to generate the text in a sentence format.

In the document creation support apparatus according to the present disclosure, the at least one processor may be configured to generate the text in an itemized format or a table format.

In the document creation support apparatus according to the present disclosure, the at least one processor may be configured to perform, based on the evaluation index, control to display options for the two or more selected regions of interest, and generate text including a description about a region of interest selected based on the options.

A document creation support method according to the present disclosure is a document creation support method in which a processor, which a document creation support apparatus includes, performs a process of acquiring information representing a plurality of regions of interest included in a medical image, acquiring position information representing a position designated by a user in the medical image displayed on a display device, selecting, based on the position information, two or more regions of interest from among the plurality of regions of interest, and deriving an evaluation index for each of the two or more selected regions of interest as a target to be in a medical document.

A document creation support program according to the present disclosure is a document creation support program for causing a processor, which a document creation support apparatus includes, to perform a process of acquiring information representing a plurality of regions of interest included in a medical image, acquiring position information representing a position designated by a user in the medical image displayed on a display device, selecting, based on the position information, two or more regions of interest from among the plurality of regions of interest, and deriving an evaluation index for each of the two or more selected regions of interest as a target to be in a medical document.

According to the present disclosure, creation of a medical document is appropriately supported also when a user designates a plurality of regions of interest.

DETAILED DESCRIPTION

An exemplary embodiment for implementing a technique of the present disclosure will be described in detail below with reference to the drawings.

First, a configuration of a medical information system 1 to which a document creation support apparatus according to the disclosed technique is applied will be described with reference to FIG. 1. The medical information system 1 is a system with which a diagnosis-target part of a photographic subject is imaged based on an examination order issued by a doctor in a diagnosis-treatment department using a known ordering system and medical images obtained through imaging are managed. The medical information system 1 is also a system with which a radiologist interprets a medical image and creates an interpretation report and the requestor doctor in the diagnosis-treatment department views the interpretation report and performs detailed observation of the interpretation-target medical image.

Figure 1:
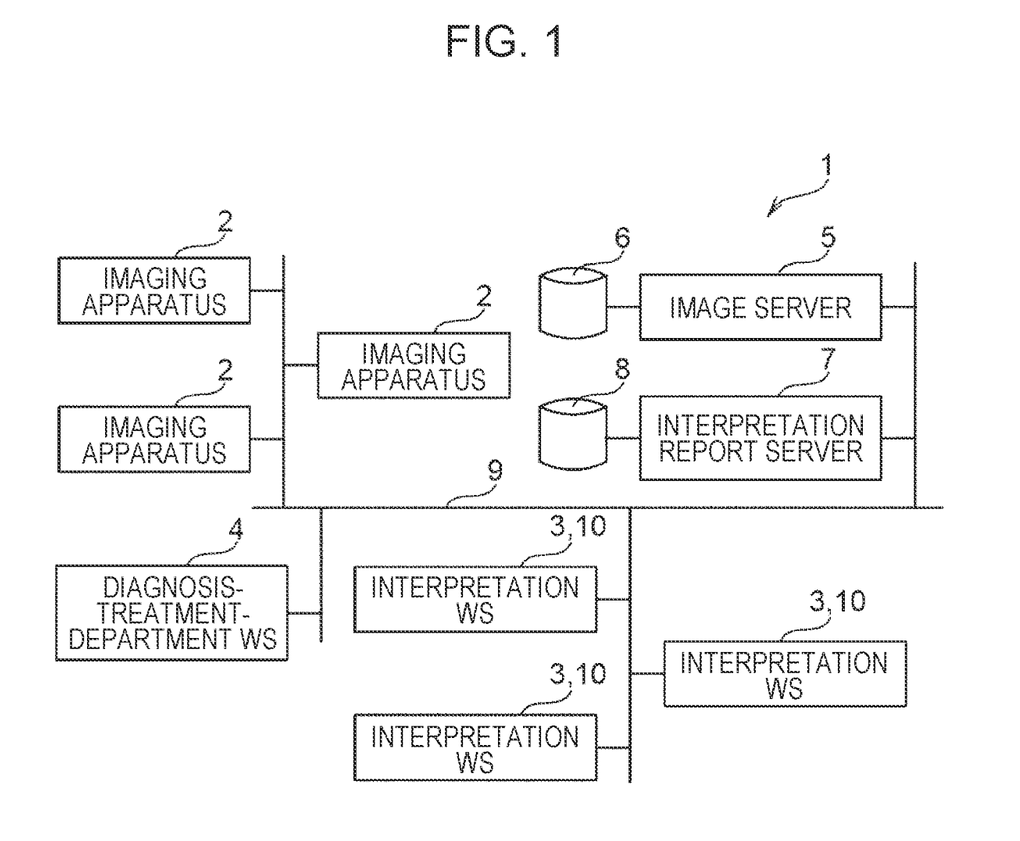
FIG. 1 is a block diagram illustrating a schematic configuration of a medical information system.

As illustrated in FIG. 1, the medical information system 1 according to the present embodiment includes a plurality of imaging apparatuses 2, a plurality of interpretation workstations (WSs) 3 that are interpretation terminals, a diagnosis-treatment-department WS 4, an image server 5, an image database (DB) 6, an interpretation report server 7, and an interpretation report DB 8. The imaging apparatuses 2, the interpretation WSs 3, the diagnosis-treatment-department WS 4, the image server 5, and the interpretation report server 7 are connected to one another via a wired or wireless network 9 to be able to communicate with one another. In addition, the image DB 6 is connected to the image server 5. The interpretation report DB 8 is connected to the interpretation report server 7.

The imaging apparatuses 2 are apparatuses each of which images a diagnosis-target part of a photographic subject to generate a medical image representing the diagnosis-target part. The imaging apparatuses 2 may be, for example, a plain X-ray imaging apparatus, an endoscope apparatus, a computed tomography (CT) apparatus, a magnetic resonance imaging (MRI) apparatus, a positron emission tomography (PET) apparatus, and the like. Medical images generated by the imaging apparatuses 2 are transmitted to the image server 5 for storage.

The diagnosis-treatment-department WS 4 is a computer used by a doctor in a diagnosis-treatment department to perform detailed observation of a medical image, view an interpretation report, create an electronic medical chart, and so on. The diagnosis-treatment-department WS 4 performs processes of creating an electronic medical chart of a patient, issuing a request to view an image to the image server 5, and displaying a medical image received from the image server 5 by executing software programs for the respective processes. The diagnosis-treatment-department WS 4 also performs processes of automatically detecting or performing emphasized display of a suspected disease region in a medical image, issuing a request to view an interpretation report to the interpretation report server 7, displaying an interpretation report received from the interpretation report server 7, and so on by executing software programs for the respective processes.

In the image server 5, a software program for providing functions of a database management system (DBMS) to a general-purpose computer is installed. In response to accepting a request to register a medical image from any of the imaging apparatuses 2, the image server 5 adjusts the medical image in a format for the database and registers the resulting medical image in the image DB 6.

In the image DB 6, image data representing a medical image acquired by each of the imaging apparatuses 2 and accessory information accompanying the image data are registered. The accessory information includes, for example, information such as an image identification (ID) for identifying an individual medical image, a patient ID for identifying a patient who is a photographic subject, an examination ID for identifying examination details, and a unique identification (UID) assigned to the medical image. The accessory information also includes information such as an examination date and an examination time when the medical image was generated, a kind of an imaging apparatus used in the examination to acquire the medical image, patient information (for example, a name, an age, and a sex of the patient), an examination-target part (that is, an imaging-target part), imaging information (such as for example, an imaging protocol, an imaging sequence, an imaging method, imaging conditions, and whether a contrast medium was used), and a series number or collection number assigned when a plurality of medical images were acquired in a single examination. In response to receiving a request to view a medical image from any of the interpretation WSs 3 via the network 9, the image server 5 searches for the medical image registered in the image DB 6 and transmits the retrieved medical image to the interpretation WS 3 that is a requestor. In the interpretation report server 7, a software program for providing functions of the DBMS to a general-purpose computer is installed. In response to accepting a request to register an interpretation report from any of the interpretation WSs 3, the interpretation report server 7 adjusts the interpretation report in a format for the database and registers the resulting interpretation report in the interpretation report DB 8. In response to accepting a request to search for an interpretation report, the interpretation report server 7 searches the interpretation report DB 8 for the interpretation report.

In the interpretation report DB 8, for example, an interpretation report is registered in which information such as an image ID for identifying an interpretation-target medical image, a radiologist ID for identifying a radiologist who performed the interpretation, a lesion name, lesion position information, a finding, and a reliability of the finding is recorded.

The network 9 is a wired or wireless local area network that connects various devices in the hospital to one another. When the interpretation WSs 3 are installed in other hospitals or clinics, the network 9 may be configured such that local area networks in the individual hospitals are connected to each other via the Internet or a dedicated line. In any case, the network 9 is preferably configured to be able to implement high-speed transfer of medical images like an optical network or the like.

Each of the interpretation WSs 3 issues a request to view a medical image to the image server 5, performs various image processing processes on the medical image received from the image server 5, displays the medical image, performs an analysis process on the medical image, performs emphasized display of the medical image based on an analysis result, and creates an interpretation report based on the analysis result. Each of the interpretation WSs 3 also supports creation of an interpretation report, issues a request to register the interpretation report and a request to view the interpretation report to the interpretation report server 7, displays the interpretation report received from the interpretation report server 7, and so on. Each of the interpretation WSs 3 performs the processes described above by executing software programs for the respective processes. Each of the interpretation WSs 3 includes a document creation support apparatus 10 described below. Processes other than processes performed by the document creation support apparatus 10 among the processes described above are performed based on well-known software programs. Thus, a detailed description is omitted herein. Each of the interpretation WSs 3 performs the processes other than the processes performed by the document creation support apparatus 10. Alternatively, a computer that performs those other processes may be separately connected to the network 9, and the computer may perform any of those processes in response to a request for the process from any of the interpretation WSs 3. The document creation support apparatus 10 included in each of the interpretation WSs 3 will be described in detail below.

Figure 2:
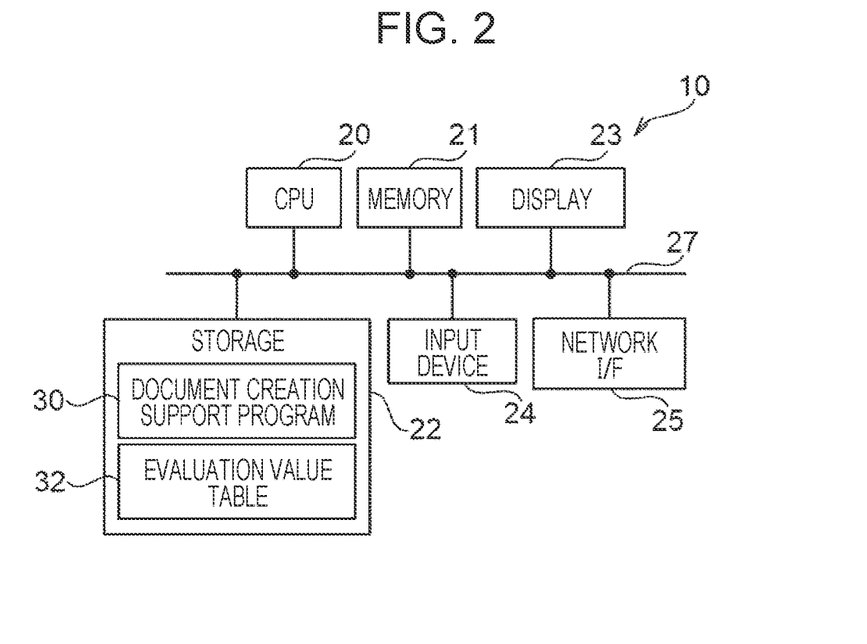
FIG. 2 is a block diagram illustrating an example of a hardware configuration of a document creation support apparatus.

A hardware configuration of the document creation support apparatus 10 according to the present embodiment will be described next with reference to FIG. 2. As illustrated in FIG. 2, the document creation support apparatus 10 includes a central processing unit (CPU) 20, a memory 21 serving as a temporary storage area, and a nonvolatile storage 22. The document creation support apparatus 10 also includes a display 23 such as a liquid crystal display, an input device 24 such as a keyboard and a mouse, and a network interface (I/F) 25 connected to the network 9. The CPU 20, the memory 21, the storage 22, the display 23, the input device 24, and the network OF 25 are connected to a bus 27.

The storage 22 is implemented by a hard disk drive (HDD), a solid state drive (SSD), a flash memory, or the like. The storage 22, which serves as a storage medium, stores a document creation support program 30. The CPU 20 reads out the document creation support program 30 from the storage 22, loads the document creation support program 30 to the memory 21, and executes the loaded document creation support program 30.

Figure 3:
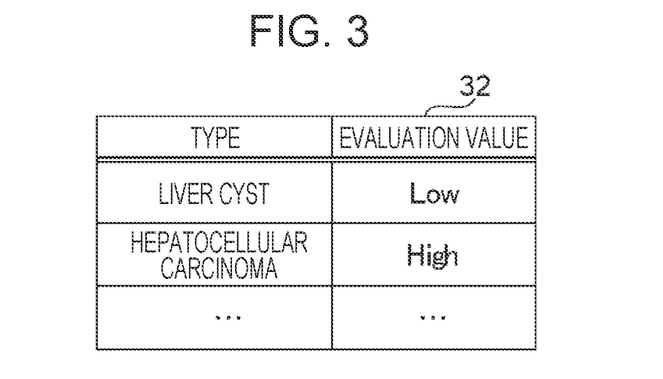
FIG. 3 is a diagram illustrating an example of an evaluation value table.

The storage 22 also stores an evaluation value table 32. FIG. 3 illustrates an example of the evaluation value table 32. As illustrated in FIG. 3, the evaluation value table 32 stores, for each type of abnormal shadow, an evaluation value for the abnormal shadow as a target to be in a medical document. Examples of the medical document include an interpretation report or the like. In the present embodiment, as the priority of being written in the interpretation report increases, a larger value is assigned as this evaluation value. FIG. 3 illustrates an example in which an evaluation value for the hepatocellular carcinoma is a value indicating "High" and an evaluation value for the liver cyst is a value indicating "Low". That is, this example indicates that the evaluation value for the hepatocellular carcinoma as a target to be in an interpretation report is higher than that for the liver cyst. In the example of FIG. 3, the evaluation value is represented by values of two steps, i.e., "High" and "Low". However, the evaluation value may be represented by values of three or more steps or by continuous values. The evaluation value described above is an example of an evaluation index according to the disclosed technique.

Note that the evaluation value table 32 may be a table in which severity is associated as the evaluation value with each disease name of an abnormal shadow. In this case, the evaluation value may be, for example, a numerical value or an evaluation index such as "MUST" or "WANT", for each disease name. "MUST" in this case means that the description is to be in the interpretation report, and "WANT" means that the description may be or may not be in the interpretation report. In the example of FIG. 3, relatively often, the hepatocellular carcinoma is severe, whereas relatively often, the liver cyst is benign. Thus, for example, the evaluation value for the hepatocellular carcinoma is set to "MUST", whereas the evaluation value for the liver cyst is set to "WANT".

Figure 4:
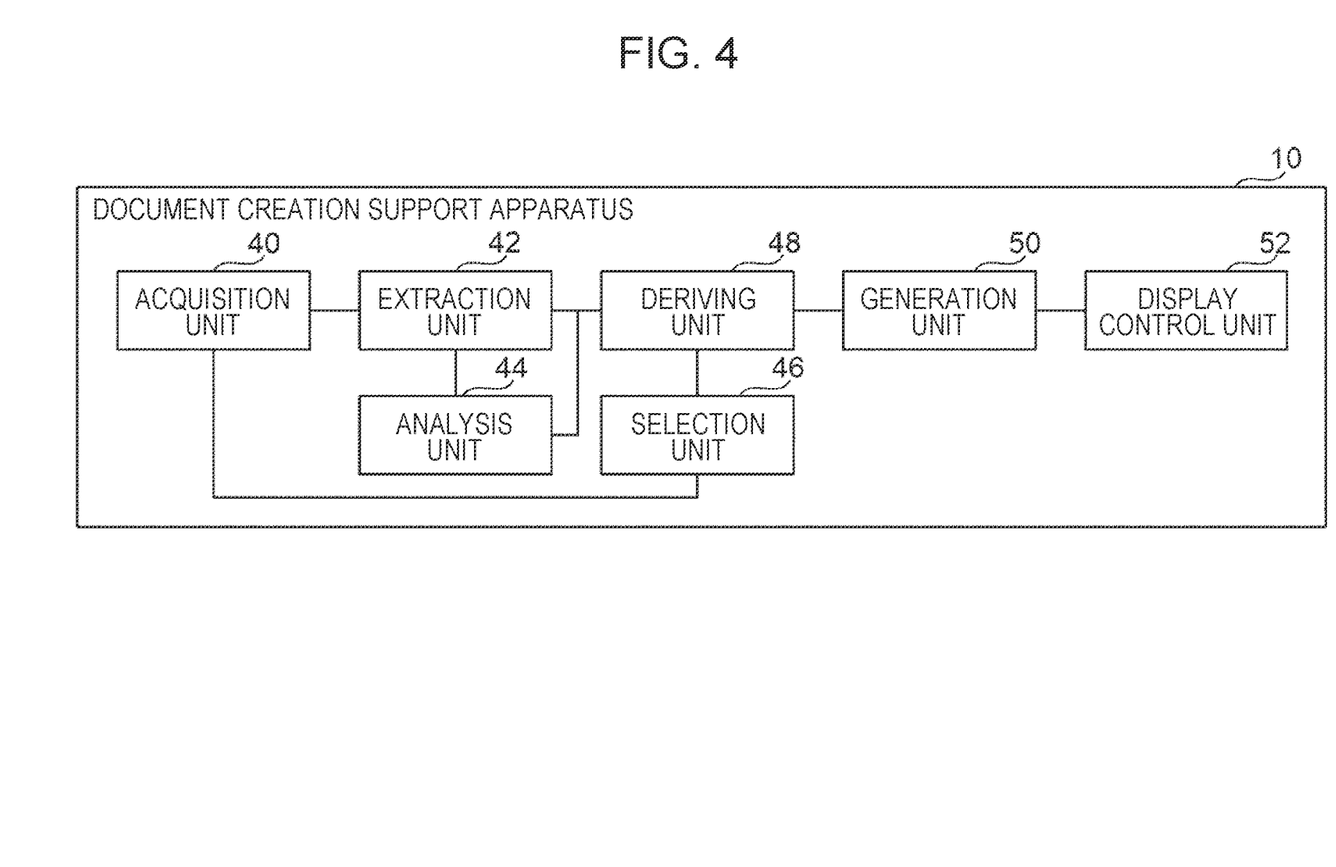
FIG. 4 is a block diagram illustrating an example of a functional configuration of the document creation support apparatus.

A functional configuration of the document creation support apparatus 10 according to the present embodiment will be described next with reference to FIG. 4. As illustrated in FIG. 4, the document creation support apparatus 10 includes an acquisition unit 40, an extraction unit 42, an analysis unit 44, a selection unit 46, a deriving unit 48, a generation unit 50, and a display control unit 52. The CPU 20 executes the document creation support program 30 to function as the acquisition unit 40, the extraction unit 42, the analysis unit 44, the selection unit 46, the deriving unit 48, the generation unit 50, and the display control unit 52.

The acquisition unit 40 acquires a medical image subjected to diagnosis (hereinafter referred to as a "diagnosis-target image") from the image server 5 via the network OF 25. A case where the diagnosis-target image is a CT image of the liver will be described as an example below. The acquisition unit 40 also acquires position information representing a position designated by a user in the diagnosis-target image displayed on the display 23 which is an example of a display device. This position information is represented by, for example, coordinates with respect to a specific point (for example, the center or one of four corners) of the diagnosis-target image serving as the origin.

The extraction unit 42 extracts a region including an abnormal shadow by using a trained model M1 for detecting an abnormal shadow, which is an example of a region of interest, in the diagnosis-target image acquired by the acquisition unit 40.

Specifically, the extraction unit 42 extracts a region including an abnormal shadow by using the trained model M1 for detecting an abnormal shadow from a diagnosis-target image. The abnormal shadow means a shadow for which a disease such as a nodule is suspected. The trained model M1 is constituted by, for example, a convolutional neural network (CNN) that receives a medical image as an input and outputs information about an abnormal shadow included in the medical image. The trained model M1 is, for example, a model that has been trained through machine learning by using, as training data, many combinations of a medical image including an abnormal shadow and information identifying a region where the abnormal shadow is present in the medical image.

The extraction unit 42 inputs a diagnosis-target image to the trained model M1. The trained model M1 outputs information identifying regions where respective abnormal shadow included in the input diagnosis-target image are present. Note that the extraction unit 42 may extract regions each including an abnormal shadow by using known computer-aided diagnosis (CAD) or may extract regions designated by a user as regions each including an abnormal shadow.

The analysis unit 44 analyzes each abnormal shadow extracted by the extraction unit 42 and derives findings about the abnormal shadow. Specifically, the analysis unit 44 derives findings about an abnormal shadow including a type of the abnormal shadow, by using a trained model M2 for deriving findings about an abnormal shadow. The trained model M2 is constituted by, for example, a CNN that receives a medical image including an abnormal shadow and information identifying a region where the abnormal shadow is present in the medical image as inputs and outputs findings about the abnormal shadow. The trained model M2 is, for example, a model that has been trained through machine learning by using, as training data, many combinations of a medical image including an abnormal shadow and information identifying a region where the abnormal shadow is present in the medical image and findings about the abnormal shadow.

The analysis unit 44 inputs, to the trained model M2, the diagnosis-target image and the information identifying the region where the abnormal shadow extracted from the diagnosis-target image by the extraction unit 42 is present. The trained model M2 outputs findings about the abnormal shadow included in the input diagnosis-target image. Examples of the findings about an abnormal shadow include a position, a size, the presence or absence of calcification, whether the abnormal shadow is benign or malignant, the presence or absence of margin irregularities, a type of the abnormal shadow, and so on.

Figure 5:
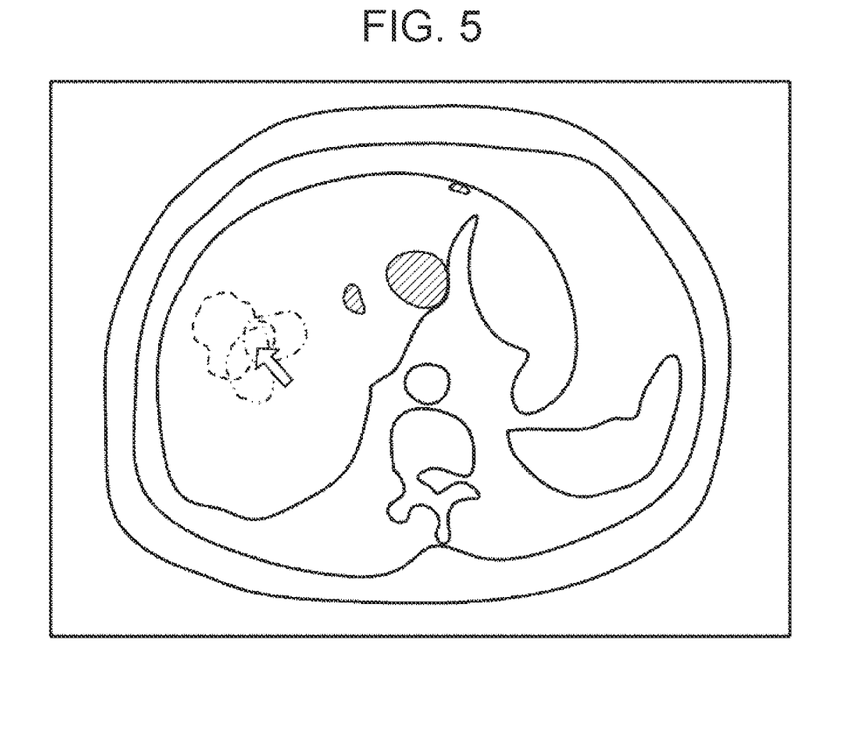
FIG. 5 is a diagram for describing an abnormal shadow selection process.

The selection unit 46 selects, based on the position information acquired by the acquisition unit 40, two or more abnormal shadows from among the plurality of abnormal shadows extracted by the extraction unit 42. Specifically, as illustrated in FIG. 5 as an example, the selection unit 46 selects abnormal shadows including therein the position represented by the position information acquired by the acquisition unit 40 from among the plurality of abnormal shadows extracted by the extraction unit 42. In the example of FIG. 5, six abnormal shadows are extracted by the extraction unit 42 and a tip of an arrow indicates the position designated by the user. In addition, in the example of FIG. 5, three abnormal shadows including therein the position designated by the user are denoted by a broken line, a one-dot chain line, and a two-dot chain line.

For example, the selection unit 46 may select two or more abnormal shadows whose distance from the position represented by the position information acquired by the acquisition unit 40 is less than or equal to a threshold value, from among the plurality of abnormal shadows extracted by the extraction unit 42. As the distance in this case, the selection unit 46 can use, for example, a distance between the position represented by the position information acquired by the acquisition unit 40 and the position of the barycenter of the abnormal shadow. In addition, for example, the selection unit 46 may select a predetermined number of (two or more) abnormal shadows in ascending order of the distance from the position represented by the position information acquired by the acquisition unit 40, from among the plurality of abnormal shadows extracted by the extraction unit 42.

The deriving unit 48 acquires information representing the plurality of abnormal shadows included in the diagnosis-target image from the extraction unit 42 and the analysis unit 44. This information representing abnormal shadows is, for example, the information identifying the regions where the abnormal shadows extracted by the extraction unit 42 are present and the information including the findings about the abnormal shadows derived for the abnormal shadows by the analysis unit 44. Note that the deriving unit 48 may acquire the information representing the plurality of abnormal shadows included in the diagnosis-target image from an external apparatus such as the diagnosis-treatment-department WS 4.

In this case, the external apparatus includes the extraction unit 42 and the analysis unit 44.

The deriving unit 48 derives, for each of the two or more abnormal shadows selected by the selection unit 46, an evaluation value as a target to be in an interpretation report. The deriving unit 48 derives the evaluation value for an abnormal shadow in accordance with a type of the abnormal shadow.

Specifically, the deriving unit 48 acquires, for each of the two or more abnormal shadows, the evaluation value associated with the type of the abnormal shadow with reference to the evaluation value table 32 to derive the evaluation value for each of the two or more abnormal shadows.

The generation unit 50 generates, based on the evaluation values derived by the deriving unit 48, text including descriptions about the two or more abnormal shadows selected by the selection unit 46. In the present embodiment, the generation unit 50 generates text including finding remarks for the two or more abnormal shadows in a sentence format. At that time, the generation unit 50 determines, in accordance with the evaluation values, a description order of the finding remarks for the two or more abnormal shadows to be included in the text. Specifically, the generation unit 50 generates text including the finding remarks for the two or more abnormal shadows in descending order of the evaluation value.

Figure 6:
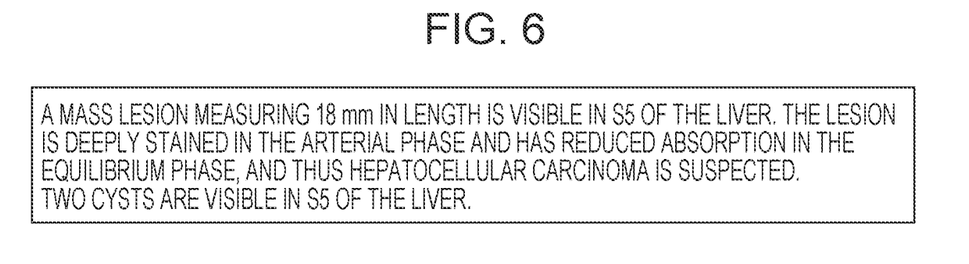
FIG. 6 is a diagram illustrating an example of text in a sentence format.

When generating a finding remark, the generation unit 50 generates the finding remark by inputting findings to a recurrent neural network that has been trained to generate text from input words, for example. FIG. 6 illustrates an example of text including finding remarks generated for a plurality of abnormal shadows by the generation unit 50. The example of FIG. 6 presents text in a sentence format including, in descending order of the evaluation value, a finding remark for one abnormal shadow of the hepatocellular carcinoma and an integrated finding remark of the findings about two abnormal shadows of the liver cysts.

Figure 7:
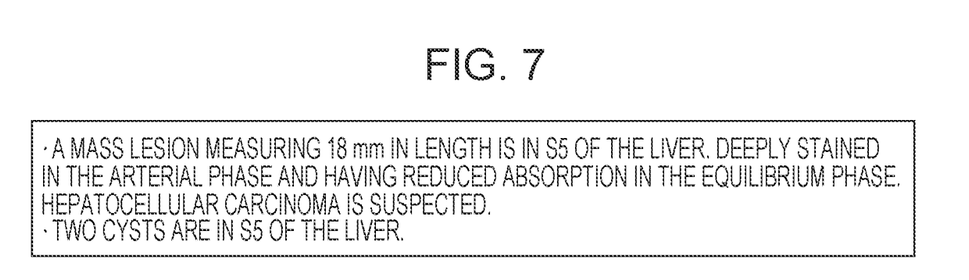
FIG. 7 is a diagram illustrating an example of text in an itemized format.
Figure 8:
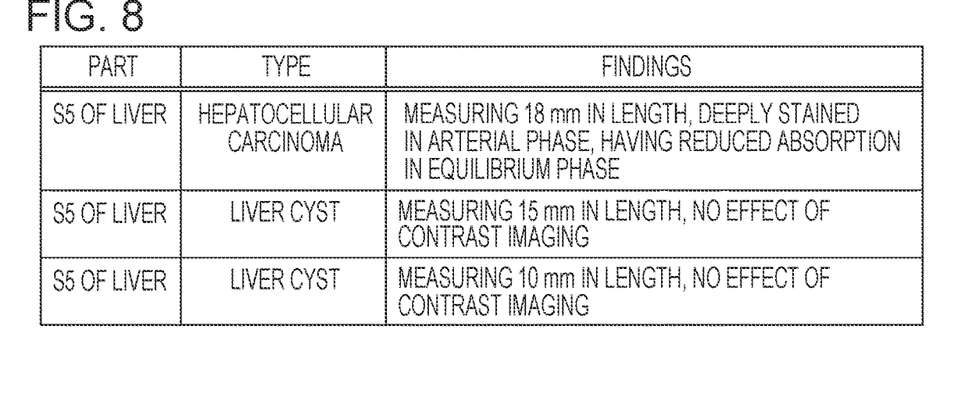
FIG. 8 is a diagram illustrating an example of text in a table format.
Figure 11:
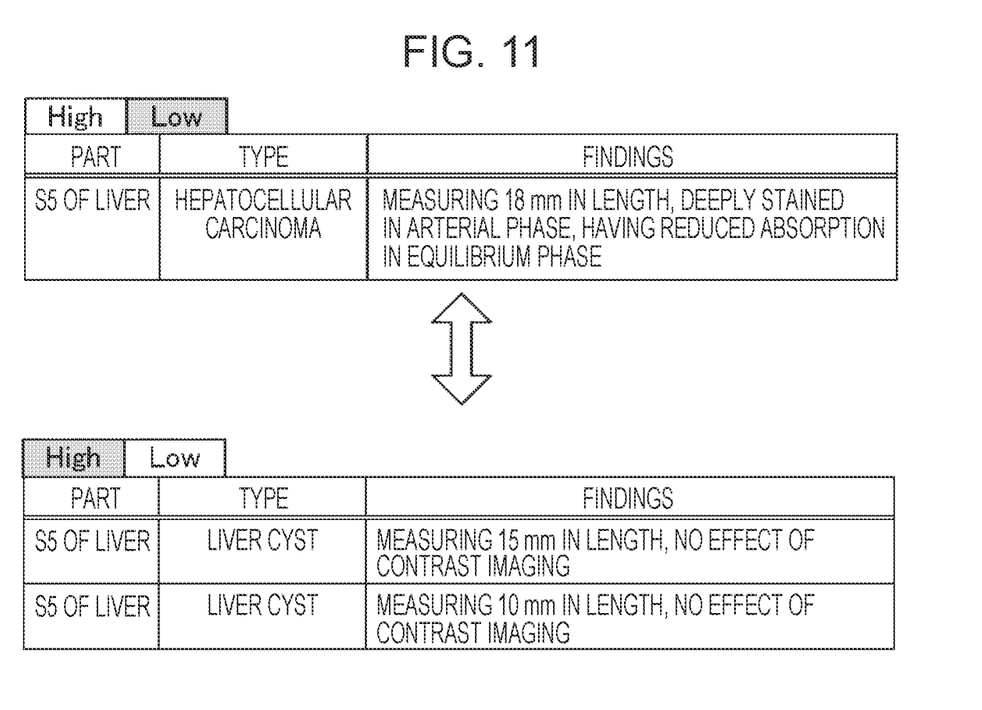
FIG. 11 is a diagram illustrating an example of text in a tab format.

Note that the generation unit 50 may generate the text including the descriptions about the two or more abnormal shadows in an itemized format or in a table format. FIG. 7 illustrates an example of text generated in the itemized format. FIG. 8 illustrates an example of text generated in the table format. The example of FIG. 7 presents text in the itemized format including the finding remark for the one abnormal shadow of the hepatocellular carcinoma and the integrated finding remark of the findings about the two abnormal shadows of the liver cysts like the example of FIG. 6. The example of FIG. 8 presents text in the table format including the findings about the one abnormal shadow of the hepatocellular carcinoma and the findings about each of the two abnormal shadows of the liver cysts. As illustrated in FIG. 11 as an example, the generation unit 50 may generate text including descriptions about a plurality of abnormal shadows in a switchable tab format. An upper portion of FIG. 11 presents an example in which a tab for the "High" evaluation value is designated. A lower portion of FIG. 11 presents an example in which a tab for the "Low" evaluation value is designated.

The display control unit 52 performs control to display the information representing the abnormal shadows extracted by the extraction unit 42 on the display 23. The display control unit 52 also performs control to display the text generated by the generation unit 50 on the display 23. The user corrects the text displayed on the display 23 if necessary and creates an interpretation report.

Figure 9:
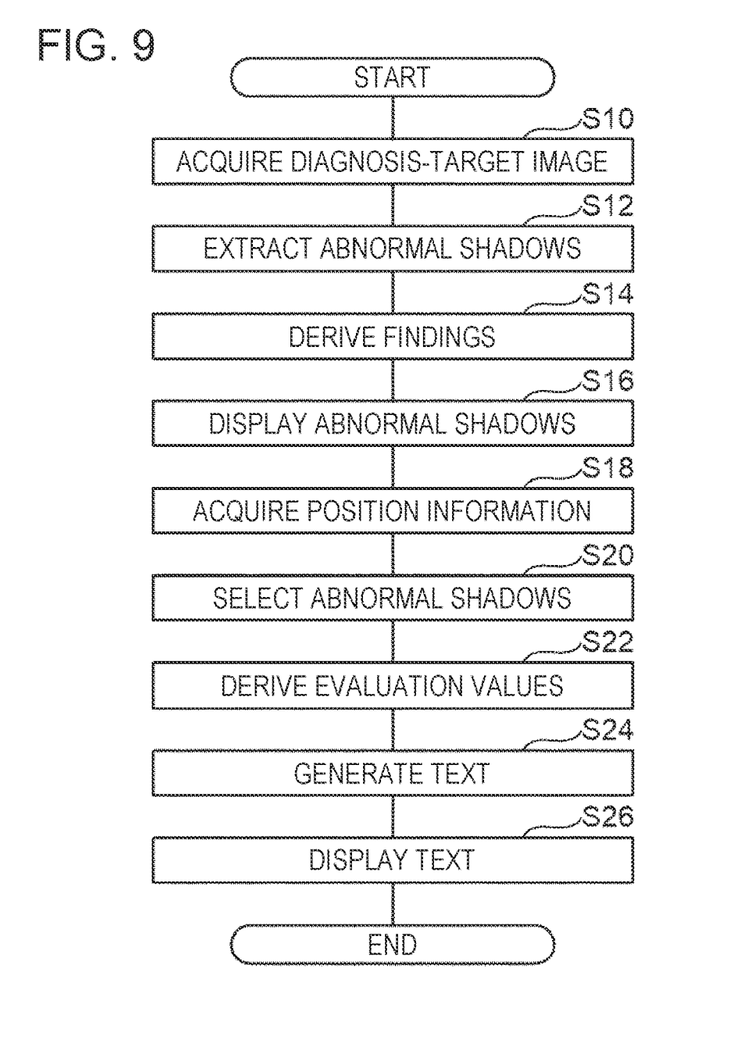
FIG. 9 is a flowchart illustrating an example of a document creation support process.

An operation of the document creation support apparatus 10 according to the present embodiment will be described next with reference to FIG. 9. The CPU 20 executes the document creation support program 30, so that a document creation support process illustrated in FIG. 9 is executed. The document creation support process illustrated in FIG. 9 is executed, for example, in response to a user inputting an instruction to start execution.

In step S10 of FIG. 9, the acquisition unit 40 acquires a diagnosis-target image from the image server 5 via the network OF 25. In step S12, the extraction unit 42 extracts, by using the trained model M1, regions including abnormal shadows in the diagnosis-target image acquired in step S10, as described above. In step S14, the analysis unit 44 analyzes, by using the trained model M2, each of the abnormal shadows extracted in step S12 and derives findings about the abnormal shadow, as described above.

In step S16, the display control unit 52 performs control to display information representing the abnormal shadows extracted in step S12 on the display 23. The user designates a position of an abnormal shadow for which a medical document is to be created, in the diagnosis-target image displayed on the display 23 in step S16. In step S18, the acquisition unit 40 acquires position information representing the position designated by the user in the diagnosis-target image displayed on the display 23 in step S16.

In step S20, the selection unit 46 selects, based on the position information acquired in step S18, two or more abnormal shadows from among the plurality of abnormal shadows extracted by the extraction unit 42, as described above. In step S22, the deriving unit 48 acquires, for each of the two or more abnormal shadows selected in step S20, an evaluation value associated with a type of the abnormal shadow derived in step S14 with reference to the evaluation value table 32 to derive the evaluation value for each of the two or more abnormal shadows, as described above.

In step S24, the generation unit 50 generates text including descriptions about the two or more abnormal shadows selected in step S20, based on the evaluation values derived in step S22, as described above. In step S26, the display control unit 52 performs control to display the text generated in step S24 on the display 23. In response to the end of the processing of step S26, the document creation support process ends.

As described above, according to the present embodiment, creation of a medical document can be appropriately supported also when a user designates a plurality of regions of interest.

In the embodiment described above, the case where a region of an abnormal shadow is used as a region of interest has been described. However, the configuration is not limited to this case. As the region of interest, a region of an organ may be used or a region of an anatomical structure may be used. When a region of an organ is used as the region of interest, the type of the region of interest means the name of the organ. In addition, when a region of an anatomical structure is used as the region of interest, the type of the region of interest means the name of the anatomical structure.

Figure 10:
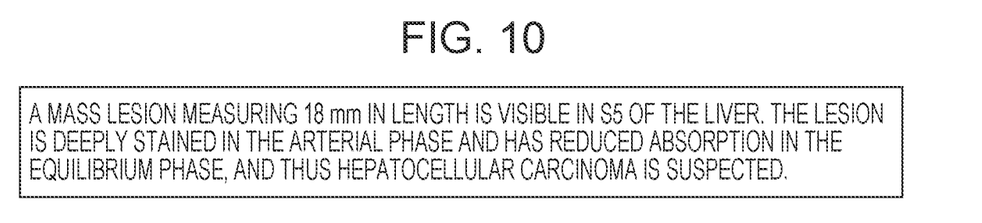
FIG. 10 is a diagram illustrating an example of text in a sentence format.

In the embodiment described above, the case where the generation unit 50 determines the description order of finding remarks for abnormal shadows to be included in text in accordance with the evaluation values has been described. However, the configuration is not limited to this case. The generation unit 50 may determine, in accordance with the evaluation values, an abnormal shadow to be included in text from among the two or more abnormal shadows selected by the selection unit 46. In this case, for example, the generation unit 50 may include only an abnormal shadow whose evaluation value is greater than or equal to a threshold value in the text among the two or more abnormal shadows. FIG. 10 illustrates an example of the text in this example. The example of FIG. 10 presents text including a finding remark for one abnormal shadow of the hepatocellular carcinoma whose evaluation value is "High" but not including finding remarks about two abnormal shadows of the liver cysts whose evaluation value is "Low".

In addition, for example, the generation unit 50 may also determine, in accordance with the evaluation values, whether to include features of the two or more abnormal shadows selected by the selection unit 46 in the text. In this case, for example, the generation unit 50 may include a finding remark representing a feature of an abnormal shadow whose evaluation value is greater than or equal to the threshold value in the text among the two or more abnormal shadows. In this case, for example, for an abnormal shadow whose evaluation value is less than the threshold value among the two or more abnormal shadows, the generation unit 50 may include the type of the abnormal shadow in the text but not include a finding remark representing the feature of the abnormal shadow in the text. Specifically, as illustrated in FIGS. 6 and 7, for example, the generation unit 50 may include the type of the abnormal shadow and the finding remark representing the feature of the abnormal shadow in the text for the abnormal shadow of the hepatocellular carcinoma whose evaluation value is "High" and include the type of the abnormal shadow in the text but not include the finding remark representing the feature of the abnormal shadow in the text for the abnormal shadow of the liver cyst whose evaluation value is "Low".

In addition, for example, the generation unit 50 may determine, in accordance with the evaluation values, a description amount of the text for the two or more abnormal shadows selected by the selection unit 46. In this case, for example, as the evaluation value for the abnormal shadow to be included in the text becomes higher, the generation unit 50 may set an upper-limit value of the number of characters of the description about the abnormal shadow to be included in the text to a greater value. For example, the generation unit 50 may generate, for the two or more abnormal shadows selected by the selection unit 46, text which includes descriptions about the abnormal shadows sequentially from an abnormal shadow with the highest evaluation value and of which an upper-limit value is a predetermined number of characters. The user may be permitted to change the upper-limit value in this case through an operation on a scroll bar or the like.

Figure 12:
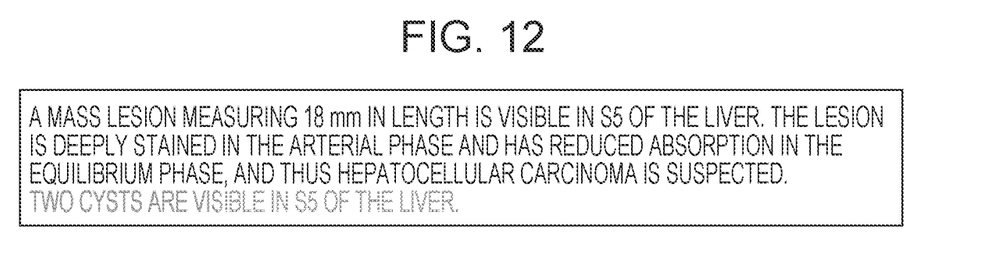
FIG. 12 is a diagram illustrating an example of text in a sentence format according to a modification.

When displaying the text generated by the generation unit 50 on the display 23, the display control unit 52 may change a display style of the description about the abnormal shadow included in the text in accordance with the evaluation value. Specifically, as illustrated in FIG. 12 as an example, the display control unit 52 performs control to display a description about an abnormal shadow whose evaluation value is greater than or equal to a threshold value (for example, an evaluation value of "High") as characters in black and display a description about an abnormal shadow whose evaluation value is less than the threshold value (for example, an evaluation value of "Low") as characters in gray that is a color lighter than black. If the user performs an operation such as clicking on the description about the abnormal shadow whose evaluation value is less than the threshold value, the display control unit 52 may display the description in the same display style as the description about the abnormal shadow whose evaluation value is greater than or equal to the threshold value. The user may drag and drop the description about the abnormal shadow whose evaluation value is less than the threshold value, so that the description can be integrated with the description about the abnormal shadow whose evaluation value is greater than or equal to the threshold value.

In addition, for example, in response to an instruction from the user, the display control unit 52 may perform control to display a description about an abnormal shadow that is not displayed on the display 23 in accordance with the evaluation value. If the user manually inputs text for the displayed text, the display control unit 52 may perform control to display a description similar to the text manually input by the user from among descriptions about abnormal shadows whose evaluation value is less than the threshold value.

In addition, for example, the generation unit 50 may correct the evaluation value in accordance with an examination purpose of the diagnosis-target image. Specifically, the generation unit 50 corrects the evaluation value for the abnormal shadow that matches the examination purpose of the diagnosis-target image to be higher. For example, when the examination purpose is to determine the "presence or absence of the pulmonary emphysema", the generation unit 50 corrects the evaluation value for an abnormal shadow including the pulmonary emphysema to be higher. For example, when the examination purpose is to "determine the size of the aneurysm", the generation unit 50 corrects the evaluation value for an abnormal shadow including the aneurysm to be higher.

In addition, in the embodiment described above, the case where the deriving unit 48 derives, for each of the two or more abnormal shadows selected by the selection unit 46, the evaluation value for the abnormal shadow in accordance with the type of the abnormal shadow has been described. However, the configuration is not limited to this case. For example, the deriving unit 48 may derive, for each of the two or more abnormal shadows, the evaluation value in accordance with presence or absence of a change from an identical abnormal shadow detected in a past examination. In this case, for example, among the two or more abnormal shadows, the deriving unit 48 may set the evaluation value of an abnormal shadow for which the identical abnormal shadow has been detected in a medical image captured for the identical imaging-target part of the identical photographic subject in a past examination and for which there is a change from the abnormal shadow included in the past medical image to be higher than the evaluation value of an abnormal shadow without a change. This is useful for follow-up of an abnormal shadow detected in a past examination. The change in an abnormal shadow in this case may be, for example, a change in the size of the abnormal shadow, a change in the progress of the disease, or the like. In this case, to ignore errors, the deriving unit 48 may assume that there is no change for a change that is less than or equal to a predetermined amount of change.

In addition, for example, the deriving unit 48 may derive, for each of the two or more abnormal shadows, the evaluation value in accordance with whether an identical abnormal shadow has been detected in a past examination. In this case, for example, among the two or more abnormal shadows, the deriving unit 48 may set the evaluation value of an abnormal shadow for which an identical abnormal shadow has not been detected in a medical image captured for the identical imaging-target part of the identical photographic subject in a past examination to be higher than the evaluation value of an abnormal shadow for which the identical abnormal shadow has been detected. This is useful for drawing the user's attention to an abnormal shadow that has newly appeared. In addition, for example, the deriving unit 48 may set the evaluation value for an abnormal shadow that has been reported in an interpretation report in the past to the highest value.

In addition, for example, the deriving unit 48 may derive the evaluation value in accordance with whether an abnormal shadow of a type identical to a type of each of the two or more abnormal shadows has been written. Specifically, for example, if the user repeats the above-described work of designating a position and generating a finding remark a plurality of times, the deriving unit 48 may set the evaluation value of an abnormal shadow for which an abnormal shadow of the identical type is already written in an interpretation report among the two or more abnormal shadows to be lower than the evaluation value of an abnormal shadow for which an abnormal shadow of the identical type is not written.

In addition, for example, the deriving unit 48 may derive the evaluation value in accordance with a distance between each of the two or more abnormal shadows and the position designated by the user and represented by the position information acquired by the acquisition unit 40. Specifically, for example, the deriving unit 48 may set the evaluation value for each of the two or more abnormal shadows to be higher as a distance from the position designated by the user becomes shorter. As the distance in this case, the deriving unit 48 can use, for example, a distance between the position represented by the position information acquired by the acquisition unit 40 and the position of the barycenter of the abnormal shadow.

In addition, for example, when displaying the text, the display control unit 52 may perform control to display a description about the abnormal shadow whose evaluation value becomes higher than that derived at the time of detection in the past examination to be distinguishable from descriptions about the other abnormal shadows. Specifically, the display control unit 52 performs control to display a description about an abnormal shadow whose evaluation value derived at the time of detection in the past examination is less than a threshold value and whose evaluation value in a current examination is greater than or equal to the threshold value to be distinguishable from descriptions about the other abnormal shadows. An example of the distinguishable display in this case may be changing at least one of the font size or the font color, or the like.

In addition, a plurality of evaluation values described above may be combined. The evaluation value in this case is calculated by using, for example, Equation (1) below.

$$\text{Evaluation value} = V1 \times V2 \times V3 \quad (1)$$

V1 represents, for example, an evaluation value that is set as a numerical value in advance for each type of abnormal shadow in the evaluation value table 32. V2 represents, for example, a value indicating the presence or absence of a change from the identical abnormal shadow detected in a past examination and whether the identical abnormal shadow has been detected in the past examination. For example, V2 is set to "1.0" if the identical abnormal shadow has been detected in a past examination and there is a change, is set to "0.5" if the identical abnormal shadow has been detected in a past examination and there is no change, and is set to "1.0" if the identical abnormal shadow has not been detected in a past examination. For example, V3 is set to "1.0" in the case of an abnormal shadow that matches the examination purpose of the diagnosis-target image and is set to "0.5" in the case of an abnormal shadow that does not match the examination purpose of the diagnosis-target image.

In addition, in the embodiment described above, the document creation support apparatus 10 may present the evaluation value derived by the deriving unit 48 to the user and accept the evaluation value corrected by the user. In this case, the generation unit 50 generates text by using the evaluation value corrected by the user.

Figure 13:
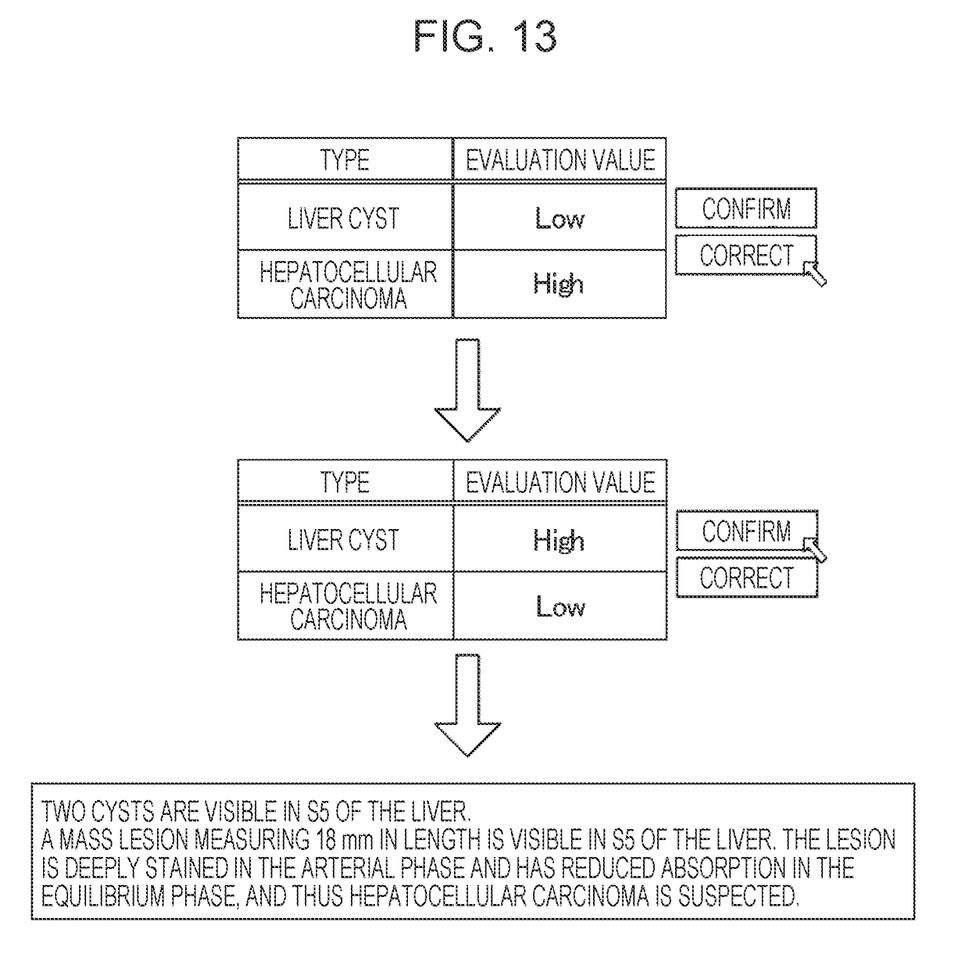
FIG. 13 is a diagram for describing a process related to correction of evaluation values.

Specifically, as illustrated in FIG. 13 as an example, the display control unit 52 performs control to display the evaluation values derived by the deriving unit 48 on the display 23. In response to the user performing an operation to confirm the evaluation values after correcting the evaluation values, the generation unit 50 generates text by using the evaluation values reflecting the correction made by the user.

Figure 14:
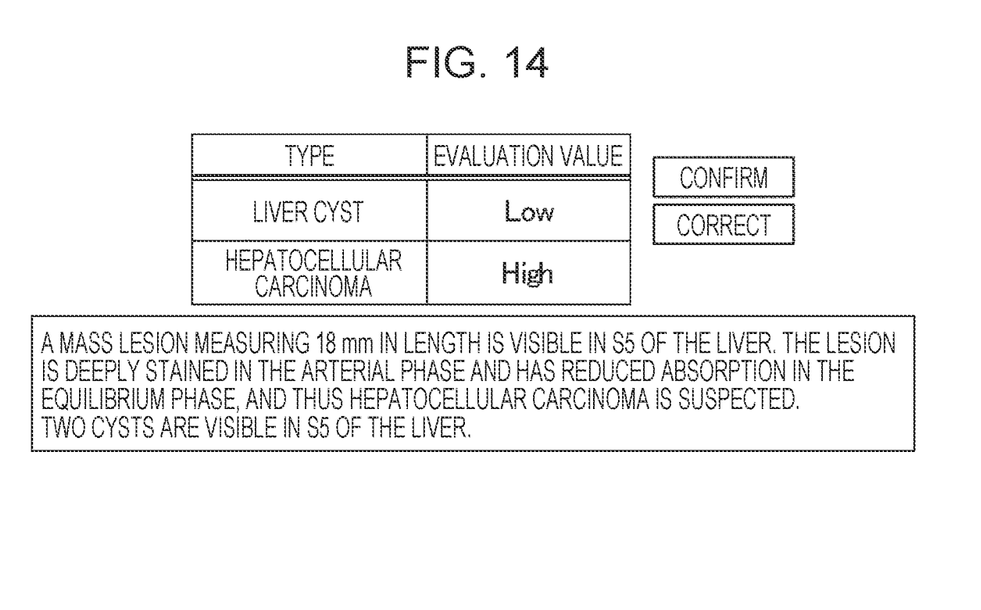
FIG. 14 is a diagram for describing the process related to correction of evaluation values.

In addition, as illustrated in FIG. 14 as an example, when performing control to display the text generated by the generation unit 50 on the display 23, the display control unit 52 may perform control to display the evaluation values derived by the deriving unit 48 together with the text.

Figure 15:
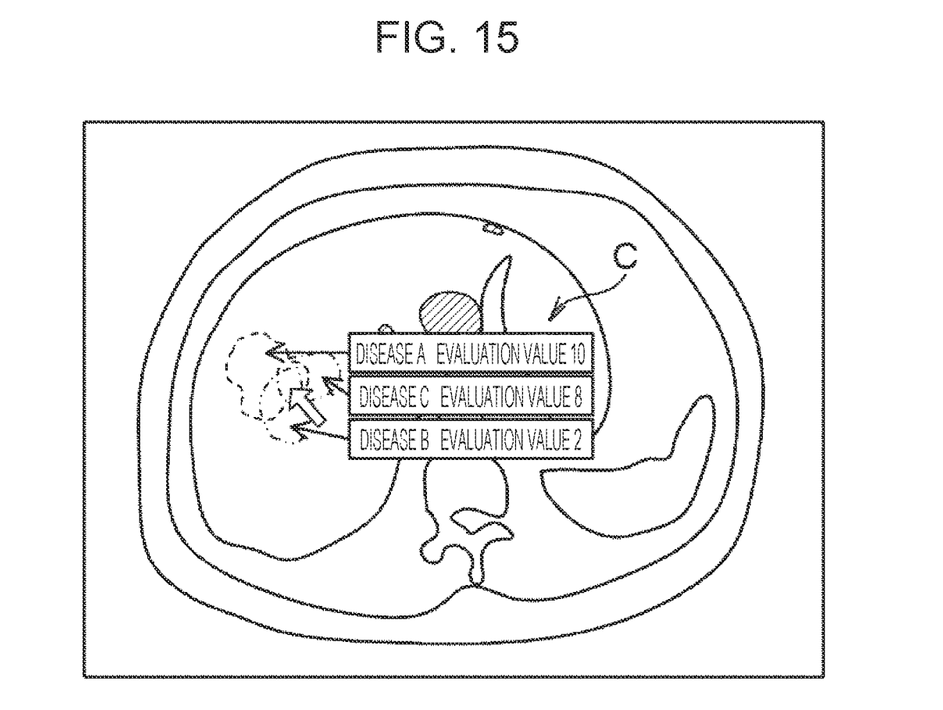
FIG. 15 is a diagram illustrating a display example of options.

In addition, in the embodiment described above, after the user designates a position in the diagnosis-target image displayed on the display 23, the display control unit 52 may perform control to display options C for the two or more abnormal shadows on the display 23, based on the evaluation values derived by the deriving unit 48 for the two or more abnormal shadows selected by the selection unit 46. Specifically, as illustrated in FIG. 15 as an example, the display control unit 52 performs control to display, as the options C, the types of abnormal shadows and the respective evaluation values for the abnormal shadows on the display 23 in descending order of the evaluation value sequentially from the top.

For example, the user selects abnormal shadows for which the user desires to write a finding remark in an interpretation report from among the options C displayed on the display 23, in an order in which the user desires to write the finding remark. The generation unit 50 generates text including, in the selected order, the finding remarks for the abnormal shadows selected based on the options C. For example, if the user selects a disease A and a disease C in this order in FIG. 15, the generation unit 50 generates text including finding remarks for the abnormal shadows corresponding to the respective diseases in the order of the disease A and the disease C. If there is an option that is not selected by the user, the generation unit 50 need not include a finding remark for the abnormal shadow corresponding to the option C in the text.

In addition, for example, the user may select an abnormal shadow for which the finding remark need not be written in the interpretation report from among the options C displayed on the display 23. In this case, the generation unit 50 may generate text including the finding remarks about the abnormal shadows corresponding to the options C not selected by the user in descending order of the evaluation value.

In addition, in the embodiment described above, for example, as a hardware structure of processing units that execute various processes such as the acquisition unit 40, the extraction unit 42, the analysis unit 44, the selection unit 46, the deriving unit 48, the generation unit 50, and the display control unit 52, various processors described below can be used. The aforementioned various processors include, in addition to a CPU which is a general-purpose processor that executes software (program) to function as the various processing units as described above, a programmable logic device (PLD), such as a field programmable gate array (FPGA), which is a processor whose circuitry is changeable after production; a dedicated electric circuit, such as an application specific integrated circuit (ASIC), which is a processor having circuitry designed exclusively for executing specific processing; and the like.

A single processing unit may be constituted by one of these various processors, or by a combination of two or more processors of the same kind or different kinds (for example, a combination of a plurality of FPGAs or a combination of a CPU and an FPGA). In addition, a plurality of processing units may be constituted by a single processor.

Examples in which the plurality of processing units are constituted by a single processor include a first configuration, as exemplified by computers such as a server and a client, in which a combination of one or more CPUs and software constitutes the single processor and this processor functions as the plurality of processing units. The examples also include a second configuration, as exemplified by a System on Chip (SoC) or the like, in which the processor that implements functions of the entire system including the plurality of processing units on a single integrated circuit (IC) chip is used. As described above, the various processing units are constituted using one or more of the various processors above in terms of the hardware structure.

More specifically, electric circuitry in which circuit elements such as semiconductor elements are combined can be used in terms of the hardware structure of these various processors.

In the embodiment described above, the description has been given of the configuration in which the document creation support program 30 is stored (installed) in the storage 22 in advance. However, the configuration is not limited to this one. The document creation support program 30 may be provided in a form of a recording medium, such as a compact disc read-only memory (CD-ROM), a digital versatile disc read-only memory (DVD-ROM), or a Universal Serial Bus (USB) memory, on which the document creation support program 30 is recorded. The document creation support program 30 may also be downloaded from an external apparatus via a network.

The disclosure of JP2021-081876 filed May 13, 2021 and the disclosure of JP2022-008875 filed Jan. 24, 2022 are incorporated herein by reference in their entirety. All the literatures, patent applications, and technical standards mentioned in this specification are incorporated herein by reference to the same extent as in the case where incorporation of the individual literatures, patent applications, and technical standards by reference is specifically and individually described.

What is claimed is:

1. A document creation support apparatus comprising:
   at least one processor configured to:
   acquire information representing a plurality of regions of interest included in a medical image;
   acquire position information representing a position designated by a user in the medical image displayed on a display device;
   select, based on the position information, two or more regions of interest from among the plurality of regions of interest; and
   derive an evaluation index for each of the two or more selected regions of interest as a target to be in a medical document.

2. The document creation support apparatus according to claim 1, wherein the at least one processor is configured to derive the evaluation index in accordance with a type of each of the two or more selected regions of interest.

3. The document creation support apparatus according to claim 1, wherein the at least one processor is configured to derive the evaluation index for each of the two or more selected regions of interest in accordance with presence or absence of a change from an identical region of interest detected in a past examination.

4. The document creation support apparatus according to claim 1, wherein the at least one processor is configured to derive the evaluation index for each of the two or more selected regions of interest in accordance with whether an identical region of interest has been detected in a past examination.

5. The document creation support apparatus according to claim 1, wherein the at least one processor is configured to derive the evaluation index in accordance with whether a region of interest of a type identical to a type of each of the two or more selected regions of interest has been written in the medical document.

6. The document creation support apparatus according to claim 1, wherein the at least one processor is configured to derive the evaluation index in accordance with a distance between each of the two or more selected regions of interest and the position designated by the user and represented by the position information.

7. The document creation support apparatus according to claim 1, wherein each of the plurality of regions of interest is a region including an abnormal shadow.

8. The document creation support apparatus according to claim 1, wherein the at least one processor is configured to generate, based on the evaluation index, text including descriptions about the two or more selected regions of interest.

9. The document creation support apparatus according to claim 8, wherein the at least one processor is configured to determine, in accordance with the evaluation index, a region of interest to be included in the text from among the two or more selected regions of interest.

10. The document creation support apparatus according to claim 8, wherein the at least one processor is configured to determine, in accordance with the evaluation index, whether to include a feature of a corresponding one of the two or more selected regions of interest in the text.

11. The document creation support apparatus according to claim 8, wherein the at least one processor is configured to determine, in accordance with the evaluation index, a description order of the two or more selected regions of interest.

12. The document creation support apparatus according to claim 8, wherein the at least one processor is configured to determine, in accordance with the evaluation index, a description amount of the text for the two or more selected regions of interest.

13. The document creation support apparatus according to claim 8, wherein
   the evaluation index is an evaluation value, and
   the at least one processor is configured to
   generate, for the two or more selected regions of interest, text which includes descriptions about the two or more selected regions of interest sequentially from a region of interest with the highest evaluation value and of which an upper-limit value is a predetermined number of characters.

14. The document creation support apparatus according to claim 8, wherein the at least one processor is configured to generate the text in a sentence format.

15. The document creation support apparatus according to claim 8, wherein the at least one processor is configured to generate the text in an itemized format or a table format.

16. The document creation support apparatus according to claim 1, wherein the at least one processor is configured to:
perform, based on the evaluation index, control to display options for the two or more selected regions of interest; and
generate text including a description about a region of interest selected based on the options.

17. A document creation support method in which a processor, which a document creation support apparatus comprises, performs a process of:
acquiring information representing a plurality of regions of interest included in a medical image;
acquiring position information representing a position designated by a user in the medical image displayed on a display device;
selecting, based on the position information, two or more regions of interest from among the plurality of regions of interest; and
deriving an evaluation index for each of the two or more selected regions of interest as a target to be in a medical document.

18. A non-transitory computer-readable storage medium storing a document creation support program for causing a processor, which a document creation support apparatus comprises, to perform a process of:
acquiring information representing a plurality of regions of interest included in a medical image;
acquiring position information representing a position designated by a user in the medical image displayed on a display device;
selecting, based on the position information, two or more regions of interest from among the plurality of regions of interest; and
deriving an evaluation index for each of the two or more selected regions of interest as a target to be in a medical document.

* * * * *